United States Patent [19]

Liu et al.

[11] Patent Number: 5,139,802
[45] Date of Patent: Aug. 18, 1992

[54] OXIDATION OF TEA

[75] Inventors: Richard T. Liu, Worthington; John C. Proudley, Delaware, both of Ohio

[73] Assignee: Nestec S.A., Vevey, Switzerland

[21] Appl. No.: 855,143

[22] Filed: Mar. 20, 1992

Related U.S. Application Data

[63] Continuation of Ser. No. 597,418, Oct. 15, 1990, abandoned.

[51] Int. Cl.⁵ .................................................. A23F 3/08
[52] U.S. Cl. ..................................... 426/263; 426/312; 426/597
[58] Field of Search ........................ 426/597, 263, 312

[56] References Cited

U.S. PATENT DOCUMENTS 2,863,775 12/1958 Perech .
2,975,057 3/1961 Seltzer et al. .
3,445,236 5/1969 Gurkin .
3,484,246 12/1969 Moore et al. .
3,484,247 12/1969 Graham et al. .
3,903,306 9/1975 Fairley et al. .
4,051,264 9/1977 Sanderson et al. .

OTHER PUBLICATIONS

S. Nagalakshmi, et al "The Rôle of Added Carbohydrates in Tea 'Cream' Solubilisation " Food Chemistry 13(1984) pp. 69-77.

Primary Examiner—Joseph Golian
Attorney, Agent, or Firm—Vogt & O'Donnell

[57] ABSTRACT

Green and Oolong tea leaves are oxidized to alter the organoleptic and aesthetic characteristics of aqueous extracts obtained therefrom and to provide extracts which have minimal turbidity, particularly when cooled. The oxidation reaction is performed on leaves which contain moisture only in an amount such that the oxidation reaction occurs at localized sites on and within the tea leaf structure.

10 Claims, No Drawings

OXIDATION OF TEA

CROSS REFERENCE TO RELATED APPLICATION

This application is a continuing application Ser. No. 07/597,418, filed Oct. 15, 1990, now abandoned.

BACKGROUND OF THE INVENTION

The present invention relates to oxidation of green and Oolong tea leaves to alter the organoleptic and aesthetic characteristics of extracts obtained therefrom.

As is accepted in the art, green tea is tea which has been freshly picked and which generally has undergone treatment, such as a heat treatment, to inactivate enzymes contained in the tea which oxidize chemical substances contained in the tea. As is also known in the art, Oolong tea is tea which has been subject to some enzymatic oxidation.

Black tea is prepared conventionally by subjecting freshly picked tea leaves to various processing steps which include a fermentation step which employs enzymes naturally present in the tea to effect enzymatic oxidation of chemical substances contained in the tea which results in providing the organoleptic and aesthetic characteristics, i.e., aroma, flavor and color, associated with aqueous beverage extracts obtained from black tea. Extracts of black tea may be consumed as a hot beverage or may be chilled to provide a cold beverage, or the extracts may be processed further to provide an instant water-soluble product for preparation of hot and cold beverages.

Although beverages prepared from green and Oolong teas are appreciated by consumers in various parts of the world, in some localities, particularly in the United States, consumer preferences dictate that tea beverages have the organoleptic and aesthetic characteristics of beverage extracts obtained from black tea. In contrast to the distinctive reddish coloration of extracts obtained from black tea, aqueous extracts obtained from green tea, in particular, have a yellowishgreen coloration which tends to reinforce a perception in consumers that the extracts have a "grassy" flavor and aroma and a "bitter" taste. Oolong teas have organoleptic and aesthetic characteristics which fall in between those of green and black teas.

Efforts have been undertaken in the art to treat fresh and green teas to obtain a product having characteristics which at least approach those of black tea obtained by enzymatic oxidation of fresh tea. Illustrative of such efforts are Seltzer, et al., U.S. Pat. No. 2,975,057, ("Seltzer") Gurkin, et al., U.S. Pat. No. 3,445,236, ("Gurkin") and Moore, et al., U.S. Pat. No. 3,484,246, ("Moore").

Seltzer discloses a process said to enable obtaining fermented black tea and partially fermented tea of more uniform quality from green tea. To obtain this objective, the process is carried out by extracting green tea leaves with water and then combining the aqueous extract with what is described as a "relatively small amount" of "bruised" fresh tea leaves and then heating the mixture of the extract and bruised leaves in the presence of oxygen at a temperature not to exceed 43° C. for a period of time after which the reaction mixture is heated to inactivate the enzymes. The extract obtained is said to have characteristics of black tea.

Gurkin discloses treating an aqueous extract of green tea in the presence of oxygen or treating green tea leaf in the presence of water and oxygen at a temperature above 50° C., and preferably, at a temperature of from 75° C. to 125° C., under a pressure of at least 100 psig (7.03 kg/cm$^2$), and preferably at a pressure of from 14.06 kg/cm$^2$ to 56.24 kg/cm$^2$. Times of treatment may range from 2 mins to 30 mins. It is taught that, preferably, the pH of the reaction media be above a pH of 7 prior to the treatment. In addition to demonstrating the effects of variables of pressure, time, pH and concentration of tea solids when treating aqueous extracts, Gurkin discloses treating macerated leaves in water in a ratio of water to leaf of 9:1. Gurkin also posits that the treatment may be carried out by adding a "small amount" of water to the green leaf and converting it to black tea leaf under the disclosed conditions.

Moore, which was assigned commonly with Seltzer and Gurkin, also discloses a process for treating water-soluble constituents of green tea leaves, particularly aqueous extracts thereof, in the manner of Gurkin. Moore, however, differs from Gurkin in that the process requires that the reaction media have a pH of at least 7.5. It is disclosed that such a pH was found to be a "major" factor affecting the color of the final product and that such a pH is necessary to produce a "practical degree of conversion within a commercially feasible time". When leaves are to be treated, Moore teaches that they are to be treated in an alkaline solution in which the majority of the solution is absorbed by the leaf.

Other efforts which teach treating tea leaves and tea solids in aqueous solution media include U.S. Pat. No. 3,484,247 in which heat and ozone are employed to treat an aqueous media having a pH above about 6.0.

As also is known in the art, polyphenolic substances, of which tannin compounds are included, play a significant role in providing the characteristic organoleptic and aesthetic characteristics of tea extracts. In that regard, to obtain a water-soluble oxidized tea extract having a higher tannin content for obtaining a tea beverage said to be of higher quality than is said to be obtainable in extracts obtained from enzymatically oxidized black tea, U.S. Pat. No. 2,863,775 discloses extracting fresh tea leaves, as plucked from the tree, and oxidizing the extract obtained with the aid of an inorganic catalyst, such as potassium permanganate, while heating the extract at 80° C. to 90° C.

Additionally, efforts have been undertaken to reduce what is known in the art as "turbidity" of tea extracts, which is believed due in large part to the polyphenolic substances present in the extracts. Although polyphenolic substances are readily soluble in hot water, i.e., boiling water, at beverage concentrations and at temperatures when the beverage is consumed hot, when the extracts are cooled to room temperature and below, these substances are, at most, only partially soluble in the water of the extract. Thus, the cooled extracts have a "cloudiness", known in the art as turbidity, which is not aesthetically acceptable but which, if removed from an extract result in loss of flavor and production yield losses.

U.S. Pat. No. 3,903,306 addresses the problem of turbidity by teaching a controlled pH reaction which employs hydrogen peroxide to treat an aqueous suspension of green tea. Nagalakshmi, et al. Food Chemistry 13 (1984) 69–77 disclose treating green tea by incorporating various carbohydrates into green leaves and then fermenting the treated leaves to obtain black tea having reduced cold water insoluble solids. U.S. Pat. No. 4,051,264 discloses a process for treating green tea with tannase which is said to, after a traditional fermentation process, provide an extract having a reduced level of cold water insoluble solids as compared with an extract prepared from like leaves not so treated.

SUMMARY OF THE INVENTION

The present invention is characterized in that polyphenolic substances contained in moist green and/or Oolong tea leaves having a moisture content of at least 17% by weight based upon the dry weight of tea solids contained in the moist leaves ("by weight dry tea solids") are oxidized at an elevated temperature and at a pressure greater than the water vapor pressure at the elevated temperature. The reaction is characterized further in that the moist leaves are contacted at the elevated temperature with an oxidizing agent which provides an amount of molecular oxygen sufficient to the moist leaves to oxidize polyphenolic substances contained in the moist leaves.

With more particularity, the present invention is characterized in that moist green tea leaves, such as Japanese tea leaf fannings, and/or Oolong tea leaves having a moisture content of from about 17% to about 25% by weight dry tea solids are heated to an elevated temperature of from about 110° C. to about 130° C. and contacted with an oxidizing agent which provides molecular oxygen to the moist leaves in an amount of from about 0.3 moles $O_2$/kg of tea based upon the dry weight of the tea solids contained in the moist leaves ("$O_2$/kg dry tea solids") to about 2.0 moles $O_2$/kg dry tea solids for a time sufficient and at a pressure greater than a water vapor pressure at the elevated temperature for oxidizing polyphenolic substances contained in the moist leaves.

The treated leaves may be processed immediately for preparing water-soluble instant tea products, or they may be dried for subsequent extraction for preparation of a beverage.

It has been discovered that the amount of moisture employed in the oxidizing treatment of the present invention is a very critical variable. By reason of the amount of moisture employed in the process of the present invention, the leaves to be treated are only moist which is believed to facilitate the permeation of the leaves by the oxidizing agent.

For purposes of this disclosure, the term "moist" is intended to mean and is used to mean that there is no free water present between or amongst the leaves during the oxidation step which would occur if the leaves are saturated with water which would tend to cause extraction of the leaves or result in a slurry and result in providing oxidized leaves which provide extracts which have a low pH and poor flavor and color characteristics.

Thus, in the process of the present invention, by reason of the leaves being only moist and thereby having no free water present, the oxidation reaction takes place in localized sites on and within the tea leaf structure. Therefore, the pH changes which occur due to the oxidation reaction occur substantially only at the localized sites and do not substantially affect neighboring oxidation reaction sites, which would occur if free water were present. Thus, the present invention affords a method to control the pH of the oxidation reaction and avoids the need for employing alkaline compounds in the reaction to control pH or the need for significant, if any, pH adjustment of extracts obtained from the oxidized leaves.

Additionally, it has been discovered that although a broad range of moisture contents can be employed to obtain leaves which provide extracts which have substantially reduced turbidity, extracts having a desirable aroma, flavor and color are obtained only when treating leaves having a moisture content of from about 17% to about 25% by weight dry tea solids.

In carrying out the process of the present invention, the moist tea leaves, and hence the various oxidizable substances of the tea leaves, are contacted with molecular oxygen. Although various oxidizing agents can be employed to provide the molecular oxygen for the reaction, various chemical agents such as hydrogen peroxide or permanganate, for example, may be deemed undesirable because residues of the same in the treated leaves may be considered to be food additives, and thus, the final product therefore would not be considered to be 100% tea. Thus, gaseous oxidizing agents are most preferred. Suitable gaseous oxidizing agents include ozone or ozone-containing gases, but more advantageously, an oxygen-containing gas, including air and oxygenenriched air may be employed. For most efficient results, however, oxygen gas is employed as the oxidizing agent.

In addition, when carrying out the present invention with gaseous oxidizing agents, it has been discovered that for obtaining extracts having desirable aroma, flavor and color characteristics, together with minimal turbidity, the amount of molecular oxygen employed is critical in relation to the amount of the tea solids being treated. If too little molecular oxygen is present, the green aroma, flavor and color characteristics of extracts obtained from the treated leaves are not substantially altered and substantial reduction of turbidity will not be realized. If too much oxygen is employed, although a substantial reduction of turbidity is realized, the aroma, flavor and color properties of the treated leaves are affected adversely in that the oxidized leaves will provide extracts having burnt aromatic and flavor characteristics, and the color will be too dark.

In carrying out the oxidation reaction, elevated temperatures sufficient for obtaining the desired results are on the order of from about 110° C. to about 130° C., the reaction being difficult to control at temperatures above 130° C. The amount of time sufficient for carrying out the reaction is on the order of from about 5 mins to about 30 mins and is inversely proportional to the temperature and the amount of molecular oxygen employed. Thus, generally, at higher temperatures and with higher amounts of molecular oxygen, shorter times are employed. On the other hand, at lower temperatures and with lesser amounts of molecular oxygen, longer times are employed. As noted above, pressures at least greater than the water vapor pressure of the oxidizing reaction temperature of the moist tea are employed which thereby enables maintaining the reaction temperature.

DESCRIPTION OF PREFERRED EMBODIMENTS

When the tea leaves to be treated in accordance with the present invention are in a dry state having a stable moisture content, which conventionally is in a range of from about 5% to about 7% by weight dry tea solids, the leaves first are moistened with water, conveniently in the vessel in which the oxidation step is to be performed. Dependent, of course, upon inherent characteristics of the tea, moisture contents on the order of about 40% by weight dry tea solids and greater should be avoided since such amounts, generally, will result in saturation of the leaves and the presence of free water, if not an identifiable aqueous phase.

An object of the moistening step is to moisten the leaves uniformly, and to that end, preferably, the leaves are moistened by spraying them with water by means such as with a series of nozzles contained in the vessel. Preferably, the leaves being moistened are agitated, such as with a stirrer, by tumbling, or by a fluidized bed, or other such agitating means. Should a continuous system be employed which has, for example, zones for performing the various treating steps which are separated by such as surge means, a screw device may be employed for moving the leaves to be treated in and through the zones and for thereby agitating the leaves in the treating zones. In such a system, it would be preferred that the moist leaves and molecular oxygen be contacted in a countercurrent flow.

For best results, after adding water to the leaves, the moisture is allowed to equilibrate throughout the leaves, preferably while agitating the leaves, so that the moisture is substantially uniformly imbibed by and distributed in the leaves and so that there is no free water between and amongst the moist leaves to be treated in the oxidizing step.

In carrying out preferred embodiments of the present invention, specified amounts of molecular oxygen are supplied to the moist leaves, most preferably in the form of substantially pure oxygen gas as hereinafter exemplified, for obtaining particular ratios of molecular oxygen in relation to dry tea solids. Thus, a known quantity of oxygen gas is contacted with moist leaves having a known amount of dry tea solids. In cases when other sources of molecular oxygen, e.g., ozone, air, or oxygen-enriched air are employed, the available molecular oxygen may be calculated to determine the quantity of the gas required to practice the process of the present invention. As is evident, lesser quantities of molecular oxygen in the gas will require greater absolute amounts of gas.

Prior to contacting the leaves with the desired amount of molecular oxygen, for best control of the process, the moist leaves are pre-heated in the reaction vessel to the reaction temperature which is desired to be employed in the oxidizing step. To effect the heating of the moist leaves, the vessel may be jacketed for providing the heat and should contain a probe for measuring the temperature of the moist leaves. To obtain uniform heating, preferably, the moist leaves are agitated by means such as noted above.

Likewise, preferably, for enabling best control of the process, the temperature of the oxygen is increased to the desired reaction temperature prior to its introduction into the reaction vessel. In addition, for best process control, moisture is introduced into the oxygen while it is being heated so that the oxygen will be substantially saturated with moisture at the reaction temperature and pressure. To effect heating and moistening of the oxygen, most conveniently, the oxygen may be sparged through heated water, for example.

The oxidizing step may be carried out in the reaction vessel in either an open or closed mode, i.e., a system open or closed to the atmosphere, the closed system having been found to provide a better quality final product. In either system, to obtain the objective of obtaining substantially uniform contact of the oxygen with the heated moist leaves most effectively, again preferably, the heated moist leaves are agitated in the oxidizing step by means as noted above.

When the oxidizing step is carried out in a closed system, preferably, the entire quantity of the preheated moist oxygen gas required for obtaining the desired ratio of molecular oxygen to dry tea solids is introduced into the vessel containing the preheated moist tea. In the closed system, the pressure is dependent, primarily, upon the amount of oxidizing gas employed with respect to the range of temperatures employed and the void volume of the vessel.

In an open system, the reaction vessel has a vent to the atmosphere, and the desired amount of preheated moist oxygen gas is fed at a fixed rate with respect to the desired time of treatment so that the desired amount of molecular oxygen contacts the heated moist tea during the time of treatment. The vessel is vented at a fixed rate so that a pressure is maintained in the vessel which is a pressure which is at least slightly above the water vapor pressure at the elevated temperature, preferably a pressure of from about 0.35 kg/cm$^2$ to about 1 kg/cm$^2$ greater than the elevated temperature water vapor pressure. This enables maintenance of the reaction temperature.

It has been found that somewhat lesser amounts of molecular oxygen may be employed in a closed system than in an open system. That is, in the closed system, the entire quantity of oxygen gas required to obtain the desired molecular oxygen to tea solids ratio may be introduced at once, and therefore, the initial concentration of the available molecular oxygen is higher than is in the case when the entire quantity of oxygen gas is not introduced for contact with the tea leaves all at once.

To achieve the objects of the present invention in a closed system, the oxygen gas is supplied and introduced into the vessel containing the tea to be treated in an amount of from about 0.3 moles $O_2$/kg dry tea solids to about 1.3 moles $O_2$/kg dry tea solids, preferably in an amount of 0.5 moles $O_2$/kg dry tea solids to about 1.3 moles $O_2$/kg dry tea solids and most preferably in an amount of from about 0.6 moles $O_2$/kg dry tea solids to about 1.1 moles $O_2$/kg dry tea solids.

Preferably, the temperatures employed in a closed system are on the order of about 115° C. to about 120° C.

As is the case with all embodiments of the present invention, at lower reaction temperatures, the reaction may not proceed as efficiently and may require longer times, on the order of approaching up to 30 mins to obtain the desired changes of aroma, flavor, color and reduction of turbidity. On the other hand, at higher temperatures, shorter times, which may be on the order of about 5 mins to about 20 mins, may be utilized to avoid obtaining a product having burnt aroma and flavor characteristics and having a dark gray/brown color which is distinctly different from the color of conventional black teas.

In the closed system, in reactions in which preferred amounts of molecular oxygen and preferred temperatures are employed, reaction times on the order of about 10 mins to about 20 mins are preferred.

As mentioned above, in the open system, the oxygen gas is not generally as concentrated during the reaction, particularly initially, as may be provided in the closed system. Thus, the lowest amount of molecular oxygen which should be provided to realize optimal benefits of the present invention is somewhat higher than that which is employed in the closed system, and likewise, the upper extent of the range which may be employed may be somewhat higher. Hence, in the open system, oxygen gas is supplied and introduced into the reaction vessel containing the tea to be treated to contact the tea in an amount, over the desired period of the reaction time, of from about 1.0 mole $O_2$/kg dry tea solids to about 2.0 moles $O_2$/kg dry tea solids and preferably, in an amount of from about 1.0 mole $O_2$/kg dry tea solids to about 1.3 moles $O_2$/kg dry tea solids.

In the open system, times on the order of from about 15 mins to about 30 mins may be employed, but it has been found that the reaction in the open system is not as sensitive to conditions of temperature and time as in the closed system. Thus, employing an open system allows obtaining the desired results by treating the heated moist leaves over a range of preferred temperatures and times on the order of from about 115° C. to about 120° C. for about 20 mins to about 25 mins.

After the desired period of treatment, preferably, the treated tea is cooled, preferably rapidly, such as by means of introducing a cooling fluid in the jacket of the treatment reaction vessel while, preferably, continuing to agitate the treated tea. After cooling, the pressure in the vessel is released. Volatiles from the reaction may be recovered from gases released from the vessel by conventional methods known in the art.

Most efficiently, particularly for preparing tea products which will be extracted directly by the consumer, preferably in a blend with black teas, or even Oolong teas, which have been produced by conventional fermentation, the treated tea may be transferred immediately to a dryer, which preferably is a fluidized bed dryer, to dry it to a stable moisture content, at which time the collected volatiles may be added back to the dried tea by means known in the art.

For preparation of instant water-soluble tea, advantageously, the treated tea is transferred directly to an extraction vessel and processed in any of the various ways well-known to those skilled in the art for making soluble instant tea, and the collected volatiles are added back subsequently.

Thus, the present invention provides an efficient process for treating green and Oolong teas for altering the aroma, flavor and color characteristics of extracts obtained therefrom and for providing extracts having little or no noticeable turbidity, particularly in cold water.

EXAMPLES

The following examples are illustrative of the present invention and parts and percentages are by dry weight unless otherwise indicated.

DESCRIPTION OF COLOR TEST

I. 200 ml deionized water having a temperature of about 100° C. is added to 3 g of tea leaves which then are steeped for 2½ mins. The infusion then is mildly agitated for 10 secs and then allowed to stand for 2 mins, 20 secs. The extract is separated from the leaves through a 270 U.S. standard mesh NYTEX screen. The solids concentration of the extract is adjusted with deionized water to 0.3% solids by weight, and the solids adjusted extract then is allowed to cool to room temperature.

II. Following dilution to 0.3%, the color is measured using a Minolta CT 100 colorimeter with a submersible probe. The color of the extract is evaluated on the $L^*$ $a^*$ $b^*$ scale, known to those skilled in the art. Final color results are expressed in $L^*$, i.e., lightness, and $C^*$, i.e., chromaticity, wherein $C^*$ equals the square root of the sum of the squares of $a^*$ and $b^*$.

With regard to the values obtained, an extract having an $L^*$ value greater than that of another extract is lighter in color. With regard to chromaticity, which also may be characterized as hue and saturation of color, the "a" value is a measure of red to green color, the hues, and the saturation of those hues, and "b" is a measure of yellow to blue color, the hues, and the saturation of those hues. The "a" and "b" values indicate whether the extract has a grayish hue and therefor lacks color or whether the extract has a greater color and is thus more vivid. Thus, an extract having a greater $C^*$ value than that of another extract has a more vivid color which is a characteristic of extracts obtained from black tea.

For purposes of comparison, extracts of green tea generally lack color and have a grey-green hue. For comparison with the following experimental data, extracts of conventional black tea when tested in the foregoing manner generally have a $L^*$ value of about 75 and $C^*$ value of about 90.

DESCRIPTION OF TURBIDITY TEST

Testing for turbidity is performed as follows:

I. The first step of the turbidity test is performed in the same manner as the first step of the color test except that instead of allowing the solids adjusted extract to cool to room temperature, it is cooled to 10° C.

II. Turbidity of a portion of the cooled extract then is measured with a HACH ratio turbidmeter, model 18900.

For purposes of comparison with the following experimental data, conventional black tea extracts tested in the foregoing manner generally will be found have a turbidity of about 26 NTU.

EXAMPLE I

A portion of about 0.35 kg of a sample from a batch of dry Japanese green tea leaves are moistened in a vessel to a moisture content of about 23% by weight dry tea solids by spraying them with water while agitating them. After adding the water, agitation is continued for enabling the moisture to equilibrate throughout the leaves.

A jacketed pressure vessel having a void volume of about 2.8 l is preheated to a temperature of about 90° C. and then the moist leaves are placed in the vessel. The vessel then is closed to the atmosphere and heated to about 115° C. to heat the moist leaves to about 115° C., as determined by a temperature probe in the vessel, while agitating the leaves by stirring with paddles which extend through the vessel.

While heating and agitating the moist leaves in the vessel, oxygen is introduced into another vessel which has a void volume of about 2.0 l to purge the vessel of atmospheric air so that the vessel will contain substantially only oxygen and be under a pressure which is about 10 kg/cm² greater than the pressure in the jacketed vessel containing the heated moist leaves.

When the moist leaves attain a temperature of about 115° C., the pressurized oxygen is directed through a water bath heated to about 115° C. for heating and moistening the oxygen. The heated moist oxygen then is introduced into the vessel containing the heated moist leaves such that about 0.7 moles $O_2$/kg dry tea solids are present with the heated moist leaves in the reaction vessel. Then the reaction vessel is closed off to the oxygen.

The temperature of the heated moist leaves is maintained at about 115° C. for about 20 mins while agitating the leaves, after which time the temperature is reduced to about 90° C. by introducing cold water in the jacket of the reaction vessel for chilling the vessel while still agitating the treated leaves. The pressure of the vessel then is released, and the volatiles are condensed and collected. The treated tea is removed from the vessel and then dried and the collected volatiles are then added back to the dried treated leaves.

An infusion extract obtained from the treated leaves for preparing a 0.3% by weight extract has a pH of 4.0. Upon performing the color and turbidity tests, as described above, it is found that the 0.3% extract has a color of L* 74 and C* 66 and a turbidity of 18 NTU.

COMPARISON EXAMPLE I

For comparison, an infusion extract is obtained from a portion of the sample of untreated tea leaves employed in Example 1. The extract has a pH of 5. Color and turbidity tests, as described above, are performed upon a 0.3% solids by weight extract. The 0.3% extract has a color of L* 82 and C* 28 and a turbidity of 65 NTU.

Thus, the treated leaves of Example I provide a distinctly more colorful and less turbid extract than the untreated leaves.

EXAMPLE II

Water is added, as in Example I, to about a 0.35 kg portion of a sample from a batch of Japanese green tea leaves to moisten the leaves to a moisture content of about 23% by weight dry tea solids.

A jacketed pressure vessel, as employed in Example I, is preheated to about 90° C., and then the moist leaves are placed in the vessel. The vessel then is closed to the atmosphere and heated to heat the moist leaves to about 120° C., as indicated by a temperature probe in the vessel, while agitating the leaves. While the moist leaves are being heated to the 120° C. reaction temperature, oxygen is introduced into another vessel having a void volume of about 2.8 l in an amount to obtain a pressure of about 9 kg/cm$^2$ greater than the pressure in the jacketed vessel containing the heated moist leaves.

When the moist leaves attain a temperature of about 120° C., the pressurized oxygen is directed through a water bath heated to about 120° C for heating and moistening the oxygen. The heated moist oxygen then is introduced into the bottom of the jacketed vessel at which time a venting device on this reaction vessel is opened to the atmosphere to allow flow of gases out of the vessel while maintaining a pressure in the vessel of about 2 kg/cm$^2$ which assists in maintaining the reaction temperature at about 120° C. A condenser is provided to collect volatiles released from the vent.

The flow of oxygen is supplied for about 30 mins, at about 320 cc/min, at standard temperature and pressure, using an in-line flow meter, which provides molecular oxygen in an amount of about 1.25 moles O$_2$/kg dry tea solids, after which the gas supply is sealed off from the reaction vessel and the vent valve of the reaction vessel is closed. The reaction vessel is cooled by introducing cold water into the jacket, and then the pressure in the vessel is released. The treated leaves are removed from the vessel and dried. Collected volatiles then are added back to the dried treated leaves.

An infusion brew extract obtained for preparing a 0.3% extract for the color and turbidity tests has a pH of 5. The color and turbidity tests are performed. The 0.3% extract has a color of L* 76 and C* 64 and has a turbidity of 30 NTU.

COMPARATIVE EXAMPLE II

A color and turbidity test is performed upon an infusion extract of a portion of the sample from the batch of the leaves of Example II except that the leaves are not treated in accordance with the present invention of Example II. The extract has a pH of 5.7. A 0.3% extract has a color of L* 77, C* 33 and a turbidity of 74 NTU.

EXAMPLE III

About 0.35 kg portions of a sample from a batch of Japanese green tea leaves having a moisture content of 4.9% by weight dry tea solids are employed in each of several trials in a closed system mode. The reaction temperature of each trial is about 120° C., and each reaction is carried out for about 20 mins. The amount of oxygen employed in each trial is about 0.7 moles O$_2$/kg dry tea solids. The moisture content of the leaves is the variable manipulated.

A 0.3% control extract obtained from another portion of the sample of the untreated leaves has a color of L* 77 and C* 33, a turbidity of 74 NTU. The control extract has a pH of 5.6 and a greenish flavor.

| Portion | Moisture Content % Dry Basis | L* | C* | NTU | pH | Flavor |
|---|---|---|---|---|---|---|
| (1) | 4.9 | 77 | 65 | 30 | 5.6 | greenish/harsh |
| (2) | 8.7 | 74 | 68 | 17 | 5.4 | greenish/harsh |
| (3) | 12.9 | 73 | 67 | 13 | 5.2 | greenish/harsh |
| (4) | 14.3 | 74 | 65 | 11 | 5.2 | greenish/ flat |
| (5) | 16.4 | 76 | 69 | 12 | 4.9 | greenish/cooked |
| (6) | 17.0 | 76 | 73 | 13 | 4.8 | slight Oolong |
| (7) | 17.9 | 73 | 70 | 8 | 4.9 | slight Oolong/astringent |
| (8) | 19.3 | 76 | 73 | 12 | 4.8 | Oolong/astringent |
| (9) | 21.7 | 75 | 73 | 13 | 4.6 | Oolong/slightly cooked |
| (10) | 23.8 | 76 | 70 | 9 | 4.6 | slightly cooked |
| (11) | 25.0 | 76 | 70 | 9 | 4.6 | acid |
| (12) | 26.1 | 70 | 67 | 10 | 4.6 | burnt |
| (13) | 27.2 | 78 | 68 | 10 | 4.6 | burnt/acid |
| (14) | 28.0 | 73 | 66 | 7 | 4.7 | cooked/acid |
| (15) | 38.9 | 75 | 65 | 7 | 4.6 | burnt/poor |

From the foregoing, it is clear that at all moisture contents, turbidity is reduced but that a moisture content of at least about 17% must be employed to obtain flavor differentiation of significance and that less desirable flavor characteristics result when treating leaves having a moisture content above about 25%.

EXAMPLE IV

The relationship of temperature and time is demonstrated by the following table reflecting trials of treating about 0.35 kg portions of a sample from a batch of Japanese green tea leaves moisturized to about 23% by weight dry tea solids. The samples are treated with about 1.0 mole O$_2$/kg dry tea solids in a closed system.

A control extract obtained from another portion of the sample of the untreated leaves has a pH of 5.0. A 0.3% control extract has a color of L* 82 and C* 28 and a turbidity of 65 NTU.

| Portion | Time (mins) | Temp. (°C.) | L* | C* | NTU | pH | Flavor |
|---|---|---|---|---|---|---|---|
| (1) | 10 | 110 | 78 | 61 | 24 | 4.1 | greenish/slight |

-continued

| Portion | Time (mins) | Temp. (°C.) | L* | C* | NTU | pH | Flavor |
|---|---|---|---|---|---|---|---|
| (2) | 10 | 120 | 76 | 65 | 25 | 4.1 | Oolong Oolong |
| (3) | 30 | 110 | 78 | 65 | 16 | 3.8 | cooked |
| (4) | 30 | 120 | 68 | 66 | 7 | 3.6 | burnt/acid |

The results show that at higher temperatures and over longer times better color and turbidity results may be obtained but less desirable flavor and pH characteristics result.

EXAMPLE V

The following table shows results of trials with about 0.35 kg portions of a sample from a batch of Japanese green tea leaves in which reaction temperature and time in an open system are varied. The leaves treated have a moisture content of about 23% by weight dry tea solids and are contacted with about 1.25 moles $O_2$/kg dry tea solids.

A control extract obtained from another portion of the sample of the untreated leaves has a pH of 5.7. A 0.3% control extract has a color of L* 77 and C* 33 and a turbidity of 74 NTU.

| Portion | Time (mins) | Temp. (°C.) | L* | C* | NTU | pH | Flavor |
|---|---|---|---|---|---|---|---|
| (1) | 15 | 120 | 83 | 65 | 26 | 5.5 | grassy |
| (2) | 20 | 120 | 80 | 67 | 26 | 5.3 | slight Oolong/astringent |
| (3) | 30 | 120 | 76 | 64 | 30 | 5.0 | Oolong |
| (4) | 10 | 130 | 80 | 63 | 24 | 5.0 | cooked Oolong |
| (5) | 20 | 130 | 72 | 68 | 14 | 4.7 | burnt/acid |

These results show that higher temperatures and longer times may be employed in open system than in the closed system and that the effect upon pH by the open system is not as great as in the closed system.

EXAMPLE VI

The following table shows results of varying the amount of oxygen and temperature and time in a closed system and shows results with the lower end of the usable range of the amount of oxygen. The trials are run with about 0.35 kg portions of a sample from a batch of Japanese green tea leaves having a moisture content of about 23% by weight dry tea solids.

A control extract obtained from another portion of the sample of the untreated leaves has a pH of 5.0, and a 0.3% control extract has a color of L* 82 and C* 28 and a turbidity of 65 NTU.

| Portion | Time (mins) | Temp. (°C.) | Moles $O_2$/kg dry tea solids | L* | C* | NTU | pH | Flavor |
|---|---|---|---|---|---|---|---|---|
| (1) | 10 | 110 | 0.4 | 79 | 65 | 38 | 4.4 | green/grassy |
| (2) | 10 | 110 | 1.0 | 78 | 61 | 24 | 4.1 | slight Oolong/astringent |
| (3) | 10 | 120 | 0.4 | 77 | 67 | 25 | 3.9 | slight Oolong |
| (4) | 10 | 120 | 1.0 | 76 | 65 | 25 | 4.1 | Oolong |
| (5) | 20 | 115 | 0.7 | 74 | 66 | 18 | 4.0 | slight cooked |
| (6) | 30 | 110 | 0.4 | 75 | 66 | 18 | 4.0 | cooked |
| (7) | 30 | 110 | 1.0 | 78 | 65 | 16 | 3.8 | cooked/acid |
| (8) | 30 | 120 | 0.4 | 74 | 67 | 18 | 4.0 | burnt |
| (9) | 30 | 120 | 1.0 | 68 | 66 | 7 | 3.6 | burnt |

The foregoing results again show that effects of the interaction of the variables of time and temperature and also that the amount of oxygen employed and in particular, the effect of oxygen upon flavor development and pH.

EXAMPLE VII

The following shows results of varying the effect of the amount of oxygen and temperature and time in an open system wherein trials are run with about 0.35 kg portions of a sample from a batch of Japanese green tea leaves having a moisture content of about 23% by weight dry tea solids.

A control extract obtained from another portion of the sample of untreated leaves has a pH of 5.7 and a color of L* 77 and C* 33 and a turbidity of 74 NTU.

| Portion | Time (mins) | Temp. (°C.) | Moles $O_2$/kg dry tea solids | L* | C* | NTU | pH | Flavor |
|---|---|---|---|---|---|---|---|---|
| (1) | 15 | 115 | 1.8 | 82 | 65 | 34 | 5.4 | green/slight cooked |
| (2) | 20 | 115 | 0.6 | 80 | 62 | 31 | 5.4 | green/cooked |
| (3) | 30 | 115 | 1.0 | 81 | 64 | 27 | 5.1 | harsh/astringent |
| (4) | 15 | 120 | 0.6 | 82 | 63 | 28 | 5.4 | green/slight cooked |
| (5) | 15 | 120 | 1.3 | 83 | 65 | 26 | 5.5 | green/slight cooked |
| (6) | 20 | 120 | 1.3 | 80 | 67 | 26 | 5.3 | slight Oolong |
| (7) | 30 | 120 | 0.6 | 80 | 60 | 21 | 4.9 | slight Oolong/astringent |
| (8) | 30 | 120 | 1.3 | 76 | 64 | 30 | 5.0 | Oolong/good astringent |
| (9) | 10 | 130 | 0.6 | 83 | 58 | 25 | 5.1 | slight green/harsh |
| (10) | 10 | 130 | 1.3 | 80 | 63 | 24 | 5.0 | Oolong cooked |
| (11) | 20 | 130 | 1.3 | 72 | 68 | 14 | 4.7 | burnt/acid |

In addition to showing the effect of the amount of oxygen and its interrelation with temperature and time, these results again show that the open system has a lesser effect upon the pH of an extract obtained from the product than is the case in the closed system.

EXAMPLE VIII

A portion of about 0.25 kg of a sample of Oolong commercial grade tea leaves are moistened to a moisture content of about 24% by weight dry tea solids. A jacketed pressure vessel having a void volume of about 2.8 l is preheated to a temperature of about 90° C. and then the moist leaves are placed in the vessel which then is closed to the atmosphere and heated to about 115° C. while the leaves are agitated.

Oxygen gas is introduced into a second vessel having a void volume of about 2.0 l to obtain an atmosphere in the second vessel comprised substantially of only oxygen which then is charged to a pressure of about 6.5 kg/cm$^2$ greater than the pressure in the heated jacketed vessel. The pressurized oxygen gas then is heated to about 115° C. as in the prior Examples and directed to the jacketed vessel such that heated oxygen is introduced into the jacketed vessel in an amount of about 0.5 moles/kg dry tea solids.

After introduction of the heated oxygen into the jacketed vessel, the temperature of about 115° C. is maintained for about 5 mins, and then the heated leaves are cooled to about 90° C. while agitation of the leaves is continued as in the prior Examples. After cooling the leaves, the pressure in the jacketed vessel is released, and volatiles are condensed and collected.

An infusion extract of the 0.3% by weight extract has a pH of 4.7. Upon performing the color and turbidity tests described above, it is found that the 0.3% extract has a color of L* 75 and C* 69 and a turbidity of 21 NTU.

In comparison, an infusion extract of another portion of the sample of the Oolong leaves not treated in accordance with the present invention has a pH of 4.9. A 0.3% extract prepared from the infusion extract has a color of L* 68 and C* 61 and a turbidity of 30 NTU.

As is clear from the foregoing, various modifications of the present invention may be without departure from the spirit and scope of the invention as defined by the following claims.

We claim:

1. A process for treating green or Oolong tea leaves consisting essentially of heating moist tea leaves, wherein the leaves are selected from the group of tea leaves consisting of green tea leaves, Oolong tea leaves and combinations thereof and have a moisture content of from about 17% to about 25% by weight dry tea solids, to an elevated temperature of from about 110° C. to about 130° C. and contacting the heated moist leaves with an oxidizing agent which provides molecular oxygen to the heated moist leaves in an amount of from about 0.3 moles $O_2$/kg dry tea solids to about 2.0 moles $O_2$/kg dry tea solids for a time sufficient and at a pressure sufficient to maintain the elevated temperature for oxidizing polyphenolic substance contained in the heated moist leaves.

2. A process according to claim 1 wherein the oxidizing agent is selected from a group of gases consisting of oxygen gas, oxygen-containing gases, air, air enriched with oxygen, ozone and ozone-containing gases.

3. A process according to claim 1 or 2 wherein the process is carried out in a system closed to the atmosphere and wherein the heated moist leaves are contacted with the oxidizing agent in an amount for providing from about 0.3 moles $O_2$/kg dry tea solids to about 1.3 moles $O_2$/kg dry tea solids at a temperature of from 115° C. to about 120° C. for a time of from about 5 mins to about 30 mins.

4. A process according to claim 3 wherein the heated moist leaves are contacted with the oxidizing agent in an amount for providing from about 0.5 moles $O_2$/kg dry tea solids to about 1.3 moles $O_2$/kg dry tea solids.

5. A process according to claim 1 or 2 wherein the process is carried out in a system open to the atmosphere and wherein the heated moist leaves are contacted with the oxidizing agent in an amount for providing from about 1.0 moles $O_2$/kg dry tea solids to about 2.0 moles $O_2$/kg dry tea solids at a temperature of from 115° C. to 120° C. for a time of from about 15 mins to 30 mins.

6. A process according to claim 5 wherein the heated moist leaves are contacted with the oxidizing agent in an amount for providing from about 1.0 moles $O_2$/kg dry tea solids to about 1.3 moles $O_2$/kg dry tea solids.

7. A process according to claim 3 wherein the oxidizing agent is oxygen gas.

8. A process according to claim 5 wherein the oxidizing agent is oxygen gas.

9. A process according to claim 5 wherein the pressure greater than the water vapor pressure is a pressure of from about 0.35 kg/cm$^2$ to about 1 kg cm$^2$ greater than the water vapor pressure at the elevated temperature.

10. A process according to claim 2 wherein the gas contacted with the heated moist leaves has a temperature at which the moist leaves are heated.

* * * * *